United States Patent [19]

Berry

[11] 4,086,496

[45] Apr. 25, 1978

[54] METHOD FOR OPTICALLY MEASURING A CANT TO LOCATE THE NARROWEST FLAT SIDE AND ITS BOUNDARIES AND MANUFACTURING LUMBER THEREFROM

[75] Inventor: Larry R. Berry, Roseburg, Oreg.

[73] Assignee: Sun Studs, Inc., Roseburg, Oreg.

[21] Appl. No.: 778,860

[22] Filed: Mar. 18, 1977

[51] Int. Cl.$^2$ ............................................. G01N 21/30
[52] U.S. Cl. ..................................... 250/561; 144/312
[58] Field of Search ............... 250/559, 560, 561, 578; 144/312; 356/167

[56] References Cited

U.S. PATENT DOCUMENTS

3,890,509  6/1975  Maxey .................................. 250/561

*Primary Examiner*—James B. Mullins

[57] ABSTRACT

A method for optically measuring an elongate timber cant, regardless of whether in upright of inverted orientation, said cant having top and bottom substantially flat, mutually parallel surfaces separated by longitudinal wanes and having a generally trapezoidal cross section, and thereby locating the narrowest flat surface of the cant and the longitudinal boundaries thereof. The method is accomplished by effecting relative transverse movement between the cant and a crossed light pattern such that the longitudinal boundaries of the flat surfaces momentarily interrupt and restore a plurality of light beams forming the crossed light pattern, detecting four beam interruption and restoration events, and recording the amount of relative transverse movement between each of the four detected events. The resultant measurement data on the cant is used to space and orient a pair of edge trimming saws and to orient the cant in preparation for its advancement to the saws. Broken beam scanning is combined with intensity variation of the plurality of light beams at a frequency higher than any fluctuations occuring in the ambient light surrounding the measurement site, thereby providing cant measurement data which is substantially independent of ambient light fluctuations.

7 Claims, 11 Drawing Figures

METHOD FOR OPTICALLY MEASURING A CANT TO LOCATE THE NARROWEST FLAT SIDE AND ITS BOUNDARIES AND MANUFACTURING LUMBER THEREFROM

BACKGROUND OF THE INVENTION

The present invention relates to the manufacture of wood products, and more specifically to the manufacture of elongate dimension lumber such as two-by-four studs from a lumber cant having two substantially flat, mutually parallel surfaces, two irregular longitudinal wanes and a generally trapezoidal cross section.

Increasing use of secondary growth timber, with its smaller diameters and more irregular tapers than timber from mature virgin forests, has increased the difficulties of reducing somewhat cylindrical logs into dimension lumber. Simultaneously, increasing demand for lumber products, long-term growth requirements, and decreasing harvesting areas dictate the avoidance of unnecessary waste. Automated processing systems have heretofore sought to resolve these competing considerations by providing optimum cutting schemes to obtain optimum yield from each log and thereby reduce the amount of wood waste.

Conventional lumber manufacturing is generally achieved in a multi-stage process. Initially, the log undergoes a series of slab cuts resulting in a log having two substantially flat, mutually parallel faces and a reduced taper. The fist stage is typically completed by a series of longitudinal cuts parallel to the faces and transversely spaced by combinations of dimensions corresponding to the numerical "1, 2 and 4" inches used in the sizing of dimension lumber. The cants resulting from these cuts have two substantially flat, mutually parallel surfaces, two irregular longitudinal wanes and a generally trapezoidal cross section.

Longitudinal edge trimming removes the cant's irregular longitudinal wanes thereby forming rectangular dimension lumber. Since the cant typically has one flat surface which is generally narrower than the opposing surface, and since the longitudinal boundaries of both flat surfaces are irregular, derivation of the largest rectangular dimension lumber contained therein requires two longitudinal edging cuts, perpendicular to the flat surfaces and transversely spaced according to the nominal width of the lumber as limited by the narrowest width dimension of the flat surfaces. Accordingly, edge trimming requires a determination both of the narrowest width of the flat surfaces and of the orientation of that width relative to the wanes.

It has been recognized for some time that an electronic computer can calculate the most advantageous orientation and spacing of the edging cuts, but this requires an imputting device which can translate cant configuration into computer-compatible signals. Scanning cants by means of reflected light and light sensors is a well known approach to such signal translations. However, no system utilizing such apparatus has heretofore been entirely satisfactory due to inaccuracies resulting from unpredictable reflectivity characteristics of different cants and ambient light fluctuations.

In Sanglert U.S. Pat. No. 3,886,372 a cant is longitudinally advanced upon a first conveyor to a point where its narrowest flat surface is exposed to a reflective scanner. The configuration of the cant is then determined by relecting light from its narrowest flat surface to an array of light sensors. Variations in light intensity, caused by reflective qualities of flat and angular surfaces, are sensed by the light detectors and correspond to the four respective flat surface boundaries defined by the cant's wanes. A computer uses the scan data to orient the cant by using a second opposing conveyor to move the cant at right angles relative to the first conveyor, and to transversely space a pair of edge trimming saws. Thereafter, the cant is longitudinally advanced on the first conveyor to the saws.

In Maxey U.S. Pat. No. 3,890,509 a cant is transversely advanced on a fast conveyor to a slow conveyor where the cant engages indexing lugs and thereafter advances to a position where its narrowest flat surface is exposed to a reflective scanner. Scan data is used by a computer to transversely space cant chipper saws and to position a pair of adjustable stops relative to the position of the saws. Once scanning is completed, the cant is transversely advanced until it engages the stops thereby being oriented relative to the saws. Thereafter, a third conveyor longitudinally advances the cant to the saws.

In Sanglert U.S. Pat. No. 3,963,938 a cant is transversely advanced by a plurality of belts to a scanning station, where it engages reference stops with its narrowest flat surface exposed to a reflective scanner. Scan data is used to adjust a plurality of orienting stops and to transversely space cant chipper saws. Thereafter, the cant is transversely advanced by the belts until it engages and orienting stops, at which time the reference stops are released, the belts deactivated, and a plurality of rollers are activated to longitudinally advance the cant to the saws.

In Kohlberg U.S. Pat. No. 3,970,128 an improved relective cant scanner an orientation system incorporating features of Sanglert U.S. Pat. No. 3,963,938 is set forth and includes a device for selectively moving the reference stops to engage the cant at optimum positions. Finally, Dahlstrom et al U.S. Pat. No. 3,983,403 presents yet another reflective type scanner and indexing orienting apparatus.

A common difficulty present in these conventional scanners is that they determine cant boundaries by directing light upon the narrowest flat face and reflecting light therefrom to light sensors and, hence, the cant must be placed with its narrowest flat side facing the light source(s). However, mechanical transfer equipment occasionally places the cants in an inverted orientation and thereby necessitates interruptions in edge trimming operations to manually turn the cant to an upright orientation.

A further deficiency of the devices described is that reflective scanning accuracy depends on sensor light sensitivity and cant surface reflectivity. Practical lumbering operations, however, produce cants varying in surface coloration from black to white and including highly reflective sap and, hence, reflecting widely disparate quanta of light therefrom. Also, lumbering operations produce cants having wane edges which form acute angles varying from 10° to 90° relative to the flat surfaces and, hence, reflect light patterns which vary widely in their delineation of the cant's wane edges. These factors make scanner illumination levels and detector sensitivity critical. Accordingly, frequent and extensive calibrations using a wide variety of test objects are required.

Further, high wattage light sources are required and, hence, the process consumes considerable energy. Dahlstrom et al eliminates the need for high intensity lamps but does so by incorporating overly complex mechanical apparatus to elevate the cant to a position in close association with the scanner. More importantly, the low reflective quality of dark wood necessitates high response sensors having a low signal-to-noise rejection capacity. Accordingly, conventional cant scanners are quite sensitive to fluctuations in the ambient light. Maxey decreases the number of erroneous responses to ambient light fluctuations by shielding his detectors with baffles. The detectors, however, receive light from a plurality of acute angles and, as a consequence, the baffles cannot completely shield the detectors.

Yet another difficulty is that conventional cant scanners do not measure cant height. Prior cant operations were based upon the assumption that satisfactory yield could be achieved by producing only two and four inch cants and, hence, devices such as the one suggested by Maxey which differentiate between two and four inch cants have heretofore provided satisfactory results. As described earlier, optimum yield often dictates the generation of more than two cant heights, and optimum edge trimming requires cant and saw orientations which are based in part upon the cant height.

Several measuring devices of the so-called "broken beam" have also been presented for detecting log diameter and taper by advancing logs between the light source and the sensors to momentarily cause "light" and "no light" conditions which correspond to their dimensions. Denton U.S. Pat. No. 3,806,253; Sherman 3,513,321 and Chasson 3,897,156 are particularly relevant in this regard. Diameter measuring methods, however, are unsuitable for cant scanning operations in part because they do not involve maintenance of log orientation. In fact, known log processing methods require that the log be rotated after diameter scanning in order to present optimum sawing faces to the slab trimming saws. Equally important, Chasson requires a linear array sensing light from a wide range of angles, and Denton requires a 90° angular separation between his sensors, in order to compensate for the placement of the log in its V-block and for its eccentricity. Conversely, broken beam cant scanning, as described hereafter, requires that the angular separation between sensors be less than the acute angles formed by the longitudinal cant wanes with respect to the flat cant surfaces. Accordingly, the methodology disclosed by Chasson and Denton cannot supply the boundary information that is required for cant edge trimming operations.

What is needed therefore, and what the present invention provides, is a method for: (1) determining both the narrowest width of a cant's flat surfaces and the orientation of the boundaries of the narrowest width portion, (2) for orienting and transversely spacing cant trimming saws dependent upon such width, boundaries and desired lumber dimensions, and (3) for longitudinally advancing the cant to the saws in proper orientation therewith, such method being indifferent to cant coloration, or reflectivity, fluctuations in the ambient light and the upright or inverted orientation of the cant's narrowest flat surface relative to the scanner.

SUMMARY OF THE INVENTION

The present invention is directed to improvements in lumber cant processing methods of the general type described in the aforementioned prior patents. In lieu of monitoring reflected light, the present invention employs broken beam scanning, useful in processing a series of intermixed upright and inverted cants, to determine the configuration of the cants, preparatory to advancing the cants through edge trimming saws, so as to obtain the optimum spacing and orientation of the saws relative to the cant. The resultant economies achieved in accuracy, efficiency and cost by eliminating special cant handling equipment, critical dependency on cant reflectivity and light sensor response, and onerous calibration procedures inherent in conventional reflective scanners, permit more accurate and less costly cant edge trimming which optimizes lumber yield therefrom.

In the scanning scheme employed, a cant is placed transversely upon a conveyor with either flat surface resting on the conveyor and a first plurality of light beams, spaced longitudinally with respect to the cant, are directed through the cant conveyor at a first acute angle relative thereto which is less than any acute angle formed by one of the cant's wanes with respect to the conveyor surface. A second corresponding plurality of light beams displaced from the first beams by a predetermined distance are oppositely directed in a similar fashion so as to form a second acute angle relative to the conveyor which is less than any acute angle formed by the opposing wane of the cant with respect to the conveyor surface. Given these angular relationships, a cant of predetermined height undergoing relative transverse motion with respect to the beams causes two beam interruption and two beam restoration events. Motion information relative to these events is proportional to the configuration of the cant and, hence, applying known trigonometric methods, a computer can process the movement and cant height data to determine both the narrowest width of the cant's flat surfaces and the orientation of the boundaries of the narrowest width portion. Conventional numerically-actuated control equipment responsive to the computer can in turn position edge trimming saws and orient the cant relative thereto so as to achieve optimum yield cuts.

Conventional electro-optical devices such as light-emitting diodes and diode lasers produce the light beams and consume minimal amounts of energy. More importantly, the light beams are focused directly upon light sensors with no intermediate reflection from the cant, and hence optimum light sensitivity and noise rejection levels independent of cant reflectivity are easily established. Low energy requirements also facilitate variation of the intensity of the light beams and thus permit amplitude modulation thereof at frequencies exceeding those of fluctuations in the ambient light so as to prevent erroneous signals in response to these fluctuations.

It is therefore a principal objective of the present invention to provide an efficient cant processing method that is inherently accurate and independent of cant surface reflectivity and ambient light conditions.

It is a further objective of the present invention to provide a cant scanning and processing method that enhances efficiency by eliminating the need for special cant handling equipment for insuring upright cant orientation, high intensity light sources, and excessive calibration equipment.

It is a further objective of the present invention to provide a cant scanning method which also determines the height of the cant and, hence, permits variation in the edge trimming cuts dependent upon this quantity.

The foregoing and other objectives, features and advantages of the invention will be more readily understood upon consideration of the following detailed description of the invention, taken in conjunction with the accompanying drawings.

DESCRIPTION OF THE PREFERRED EMBODIMENT

Figure 1:
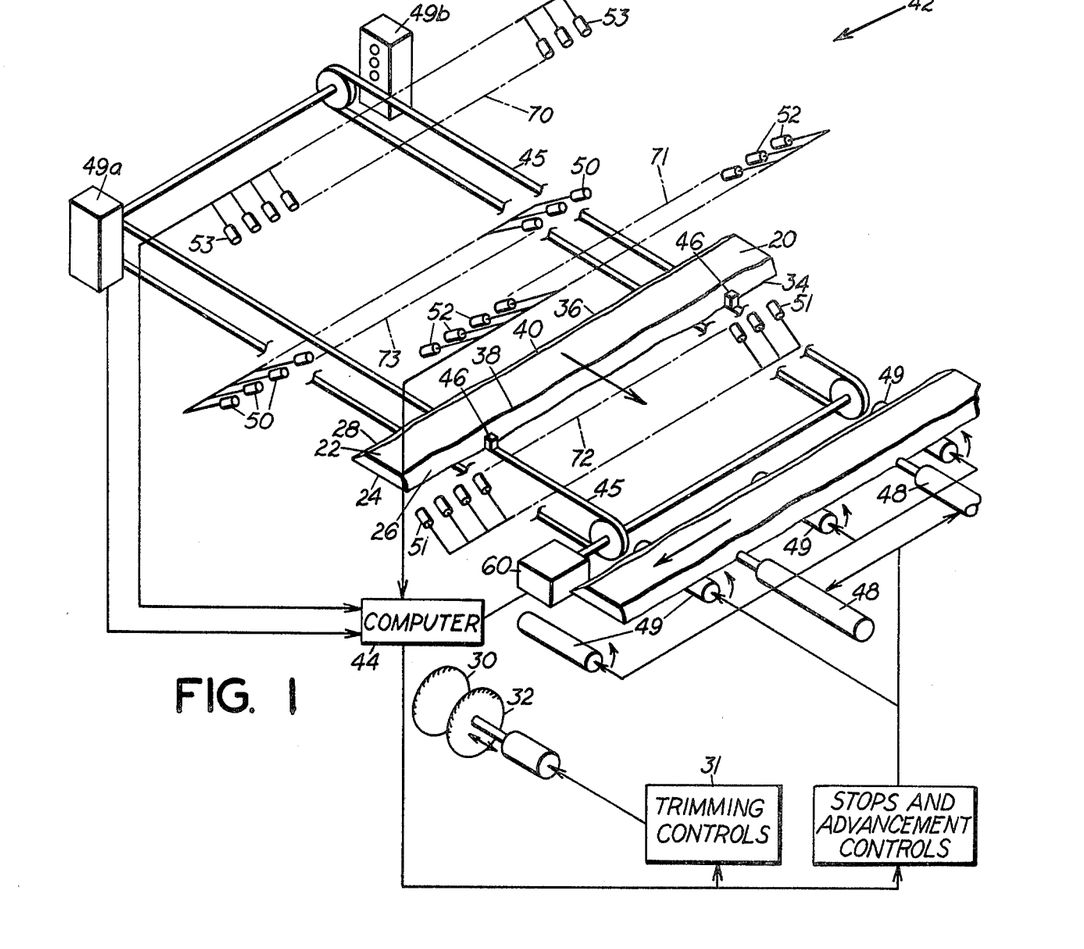
FIG. 1 is a simplified perspective view depicting an exemplary embodiment of the broken beam scanning system of the present invention.

Referring particularly to FIG. 1, the numeral 20 designates generally an elongate cant that has been sawn from a log and having substantially flat, mutually parallel, top and bottom surfaces 22 and 24, irregular longitudinal wanes 26 and 28 and a generally trapezoidal cross-sectional area. The longitudinal wanes 26 and 28 are unfinished and irregular and extend obliquely from the flat surfaces 22 and 24.

The cant 20 is to have its longitudinal wane portions removed, so that it will be brought to the form of rectangular dimension lumber, e.g. one or more 2 × 4 studs, with side surfaces accurately parallel to one another and perpendicular to the flat surfaces 22 and 24. Wane portion removal is accomplished by longitudinally advancing the cant 20 through a conventionally numerically controlled edging machine that includes a pair of edge trimming saws (more commonly referred to in the industry as "chippers" or "chipper saws") 30 and 32. Edge cuts by the saws 30 and 32 must convert the cant 20 to one or more finished lumber pieces of standardized configuration with a minimum wastage of stock.

The amount of cant material available for rectangular dimension lumber pieces depends upon the configuration and orientation of the narrowest width portion of the flat surfaces 22 and 24 and, hence, the edging cuts are calculated upon the basis of the shape and spacing of the boundaries 34 and 36 of the flat surface 24 and the boundaries 38 and 40 of the flat surface 22.

Cant configuration information is derived by a cant scanner indicated generally as 42, as described hereafter, and fed into a conventional electronic computer 44 in the form of input signals corresponding to the cant boundaries 34, 36, 38 and 40. The computer 44, utilizing these signals and known trigonometric methods, calculates the spacing between the saws 30 and 32 and the orientation of the saws relative to the transverse cross section of the cant that will effect the optimum finishing cut or cuts. Computer output signals are compatible with and direct numerically controlled apparatus to automatically effect the proper saw spacing and relative transverse orientation between the saws and the cant.

The numerically controlled edging machine and the means for spacing the saws 30 and 32 are not shown since such devices are well known in the art. However, for purposes of clarity, one method is shown in which a first saw 30 is mounted so as to be fixed in one location while the position of the opposing saw 32 is controllably adjustable so as to define a variable space between the saws. Accordingly, with saw spacing being established by adjusting the position of saw 32, it is necessary to effect a transverse cant orientation relative to the saws which will longitudinally advance the cant 20 to the saws 30 and 32 in the calculated optimum sawing relationship.

Cant orientation can be effected in any conventional manner including the methods described in the aforementioned patents. For purposes of explanation, a method is shown in which a conveyor 45 of the type exemplified by Maxey U.S. Pat. No. 3,890,509 is used to hold the leading wane 26 in releasable engagement with a pair of indexing lugs 46 during scanning so as to insure an a approximately transverse orientation of the cant as it passes through the scanner. Thereafter, a pair of adjustable cant orienting stops 48, each aligned with a respective scan station, engage the wane 26 and, using scan data, adjust the transverse position of the cant such that the cant is oriented in proper cross-sectional relationship for longitudinal advancement to the saws 30 and 32 by a conveyor 47.

Alternatively, it is possible to effect proper transverse orientation between the cant and saws without utilizing indexing lugs such as 46. For example, the outermost pairs of crossed beams undergoing signal level changes (as hereinafter described) are closely associated with the respective ends of the cant 20. By employing known, 4-way adjustable orienting stops, which can be moved to a position of alignment with a particular scan station (one of the respective pairs of crossed beams), scan data can be utilized to control the orienting stops 48 such that they engage the cant at its ends and are compensatingly adjusted so as to establish the prerequisite transverse orientation between the cant and the saws independently of deviations from a transverse presentation of the cant to the scanner 42.

The locations of cant boundaries 34, 36, 38 and 40, and the resultant width and orientation of the narrowest portion of the flat surfaces 22 and 24 which determine the eventual cut, are determined by first advancing the cant 20 upon the conveyor 45 through a conventional height scan device 49a, b, of the general type exemplified by Sherman U.S. Pat. No. 3,513,321, and thereafter through the cant configuration scanner 42. As the cant moves transversely through the parallel beams of light directed from the perpendicular light source array 49b to the perpendicular light sensor array 49a of the cant height scanner, the cross section of the cant will block light from a given number of the sensors while permitting the remainder of the sensors to remain illuminated. Accordingly, by spacing the sensors at predetermined heights relative to the supporting surface of the conveyor 45, the computer 44 can determine the cant height H. Alternatively, the cant 20 can travel longitudinally through the cant height scanner 49 a, b. It should also be noted that a wide range of methods can be used to determine cant height H, including that of sawing cants 20 to predetermined heights and manually inserting height data into the computer as the cants are sequenced through the cant configuration scanner 42.

As the cant 20 moves transversely through the cant configuration scanner 42, its cross section alternately "interrupts" and "restores" the light beams originating from the array of light sources 50 and 51 spaced longitudinally with respect to the cant and transversely to the direction of movement of the conveyor 45. These beams intersect the supporting surface of the conveyor 45 at a plurality of points and are individually received by a plurality of corresponding light sensors 52 and 53, the beams being aligned to form respective oppositely facing acute angles $\theta$ and $\theta'$ (FIG. 3) with the conveyor surface 45 that are less than any corresponding actue angles $\phi$ and $\phi'$ formed by cant wanes 26 and 28 relative to the conveyor surface, for reasons which will become apparent. As the cant 20 moves via the conveyor 45, it first interrupts the light beams from light sources 50, and thereafter interrupts the light beams from light sources 51. As the cant 20 continues to move, the light beams from sources 50 are restored and, thereafter, the light beams from sources 51 are restored. The distance that the cant 20 moves between the various interrupting and restoring points is accumulated by a standard counter mechanism 60 (FIG. 1) as the conveyor 45 and the cant move. Four detectable events, therefore, occur and combine with cant movement information to permit the computer 44 to ascertain cant configuration as defined by its boundaries 34, 36, 38 and 40.

In the embodiment shown, the system is configured such that light beams from sources 50 remain interrupted until after the light beams from sources 51 are interrupted, although this configuration is not necessary for proper operation. The light sources 50 and 51 and the light sensors 52 and 53 are located at successive spaced positions along the longitudinal axis of the cant and, hence, the cant is measured at a plurality of scan stations along substantially its entire length by a plurality of light sources and sensors as it moves transversely on the conveyor 45. It should be particularly noted, however, that the cant 20 could remain stationary while the light sources 50, 51 and the light sensors 52, 53 move in unison in a direction transverse to the cant to achieve an equivalent result.

Figure 3:
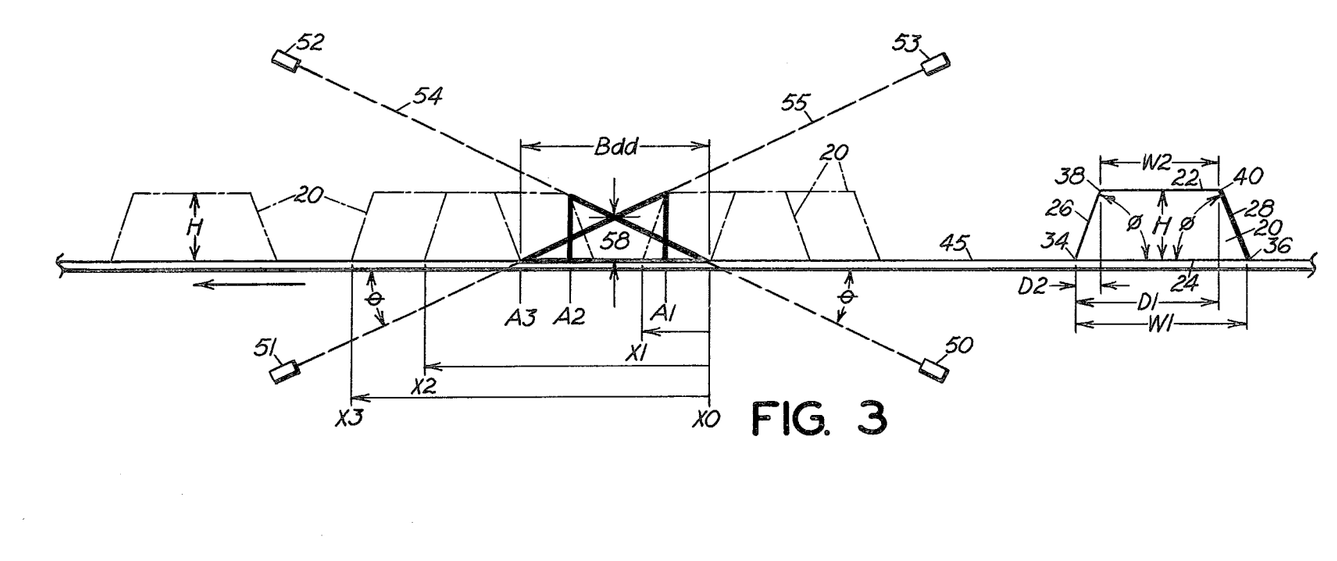
FIG. 3 is a schematic side view of the scan station of the system of FIG. 1, showing different positions of the cant during scanning.
Figure 4A:
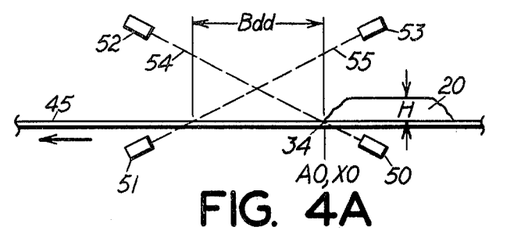
FIG. 4A is a schematic side view of the scan station as the leading bottom edge of an upright cant intersects a first light beam, thereby blocking the light from illuminating a first light detector.
Figure 4B:
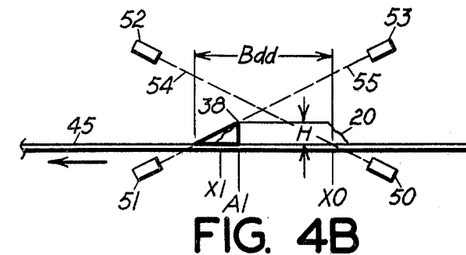
FIG. 4B shows the scan station as the leading top edge of the upright cant intersects a second light beam, thereby blocking the light from illuminating a second light detector.
Figure 4C:
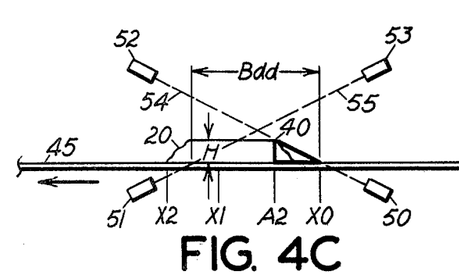
FIG. 4C shows the scan station as the trailing top edge of the upright cant exits from the path of the first light beam, thereby restoring illumination of the first light detector.
Figure 4D:
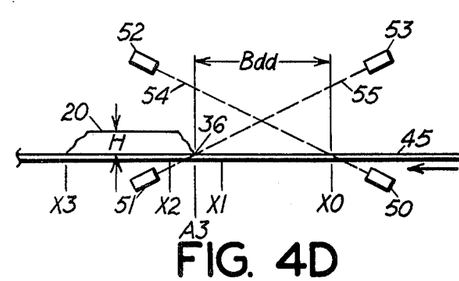
FIG. 4D shows the scan station as the trailing bottom edge of the upright cant exits from the path of the second light beam, thereby restoring illumination of the second light detector.
Figure 5A:
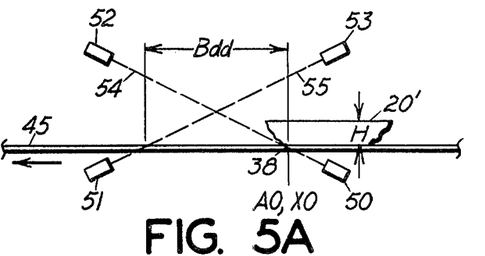
FIG. 5A shows the scan station as the leading bottom edge of an inverted cant intersects the first light beam, thereby blocking the light from illuminating the first light detector.
Figure 5B:
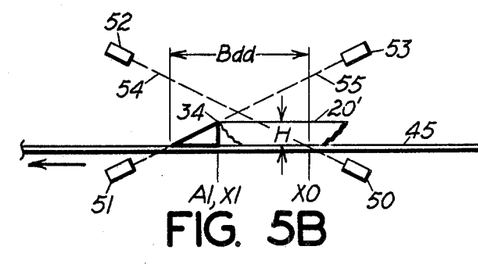
FIG. 5B shows the scan station as the leading top edge of an inverted cant intersects the second light beam, thereby blocking the light from illuminating the second light detector.
Figure 5C:
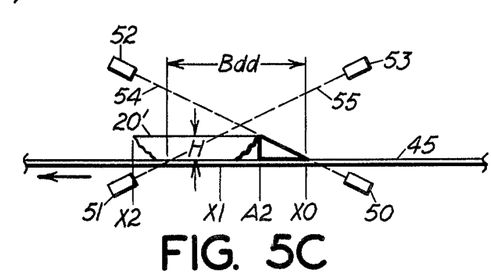
FIG. 5C shows the scan station as the trailing top edge of the inverted exits from the path of the first light beam, thereby restoring illumination of the first light detector.
Figure 5D:
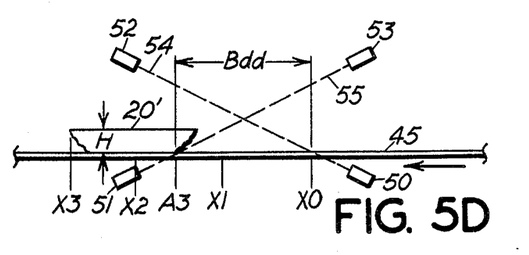
FIG. 5D shows the scan station as the trailing bottom edge of the inverted cant exits from the path of the second light beam, thereby restoring illumination of the second light detector.

In FIG. 3, a simplified side view of an exemplary scanner of the present invention is set forth which, for purposes of clarity, comprises a single scan station formed by corresponding light sources 50 and 51 and corresponding light sensors 52 and 53 combining to form a crossed light pattern with light beams 54 and 55. The light beams 54 and 55 pass through the plane defined by the supporting surface of the conveyor 45, herein referred to as the conveyor surface, at respective actute angles $\theta'$ and $\theta$, respectively, relative to the conveyor surface. The beams 54 and 55 are shown as impinging upon the conveyor surface 45 at points spaced along the length of the conveyor by a horizontal beam displacement distance Bdd, and intersecting each other at a vertical beam displacement height 58. It should be noted, however, that the beams 54 and 55 may intersect at any point below, above or at the conveyor surface 45, or be sufficiently spaced along the length of the conveyor so as not to intersect at all.

An upright cant 20 is shown approaching the scan station upon the conveyor surface 45 and having a pair of acute angles $\phi$ and $\phi'$ formed by its wanes 26 and 28 relative to the conveyor surface, respectively. As the cant advances through the scan station its leading bottom boundary 34 interrupts the first light beam 54 at a first point A0; thereafter its leading top boundary 38 interrupts the second light beam 55 at a second point A1. As the cant departs from the scan station, its trailing top boundary 40 restores the first light beam 54 at a third point A2, and thereafter its trailing bottom boundary 36 restores the second light beam 55 at a fourth point A3. Accordingly, as the cant 20 transverses the scan area, four detectable events occur, A0-A3, which are related to the cant boundaries 34, 36, 38 and 40. It is essential to note that detection of these four events is necessary for cant configuration calculations and that these events will occur only if the beam acute angle $\theta$ is less than the cant acute angle $\phi$ and the beam acute angle $\theta'$ is less than the cant acute angle $\phi'$.

Referring now to FIG. 1, the conveyor 45 is equipped with a conventional scan chain 60 which produces an increment pulse for each unit of conveyor travel. The scan chain setting must reflect the desired measurement accuracy and, hence, for 0.001 (2.5 mm) accuracy, it must be set to produce a computer compatible increment pulse for every 0.001 (2.5 mm) of conveyor travel. The combination of the four scan events A0-A3, and the movement data X0-X3 (FIG. 3) provided by the scan chain relative to these events, respectively, provide data for calculation by the computer 44 of the cant configuration in the manner to be described hereafter. However, it should be noted that other conventional methods may be utilized to generate movement data, such as providing the conveyor 45 with a constant speed servo drive.

With respect to FIGS. 3 and 4A-D, when the conveyor 45 advances the cant 20 to position A0, the leading bottom boundary 34 interrupts the first light beam 54 causing the output of sensor 52 to undergo a signal level change informing the computer 44 that a cant 20 has entered the scan area. The computer either records the current scan chain distance X0 or sets this value to zero. Continued cant advancement enables the leading top boundary 38 to interrupt the second light beam 55, causing the output of sensor 53 to undergo a signal level change which informs the computer 44 of the interruption and records the current scan chain distance X1 corresponding to the interruption. As the cant 20 progresses, the trailing top boundary 40 emerges from the path of the first light beam 54, causing sensor 52 to undergo a signal level change representing point A2. In response, the computer 44 records the current scan chain distance X2. When the cant 20 clears the scan area, the trailing bottom boundary 36 emerges from the path of the second light beam 55 causing sensor 53 to undergo a signal level change corresponding to point A3. In response, the computer 44 records the current scan chain distance X3.

The computer 44 may utilize this data to calculate the cant configuration in accordance with the following example, it being understood that similar calculations are simultaneously performed for the other pair of crossed beams distributed along the length of the cant. From point A0 to point A3, the cant 20 travels a distance equal to the horizontal beam displacement distance Bdd plus the distance from its leading bottom boundary 34 to its trailing bottom boundary 36 and, hence, the width W1 of its bottom surface 24 at the point along its length corresponding to the location of the particular pair of beams 54 and 55 is calculated as follows:

$$W1 = (X3 - X0) - Bdd \qquad (1)$$

From the initial point A0 to point A2, the cant 20 travels across the scan area until the trailing top boundary 40 emerges from the path of the first length beam 54. A perpendicular dropped from the first light beam 54 at this point to the conveyor surface 45 defines a side of a right triangle which is equal to the cant height H and whose side adjacent and hypotenuse intersect at point A0. The side adjacent defines the portion of cant travel X2-X0 attributable to advancing the leading bottom boundary 34 from a location corresponding to point A0 to a location corresponding to point A2 and, hence, the horizontal distance D1 from the leading bottom boundary 34 to the trailing top boundary 40 is equal to the difference between these two as follows:

$$D1 = (X2 - X0) - H/\tan \phi' \qquad (2)$$

From the initial point A0, the leading bottom boundary 34 of the cant must travel a distance X1 - X0 until the leading top boundary 38 intersects the second light beam 55 at point A1. During this travel, the leading top boundary 38 travels a lesser distance from point A0. A perpendicular line dropped from the second light beam 55 at the point A1 to the conveyor surface forms a right triangle having a side equal to the cant height H and having a side adjacent and a hypotenuse which intersect at point A3. The side adjacent represents the amount of travel required from point A1 to advance the leading top boundary 38 the remainder of the distance across the beam displacement distance Bdd. Since X1-X0 represents the portion of Bdd through which the leading bottom boundary 34 has traveled at point A1, the difference between X1-X0 and the lesser distance traveled by the top leading boundary 38 from point A0 to point A1 equals the distance D2 from the leading bottom boundary 34 to the leading top boundary 38 and may be expressed as:

$$D2 = (X1 - X0) - (Bdd - H/\tan \phi) \qquad (3)$$

Distance D1 includes the sum of width W2 of the top surface 22 (the distance between the leading and trailing top boundaries 38 and 40) and the distance D2 (the distance between the leading top boundary 38 and the leading bottom boundary 34). Thus, the top surface width W2 can be expressed as:

$$W2 = D1 - D2 \qquad (4)$$

In the current example, involving an upright cant, the narrowest width of a flat surface, at the particular scan station consisting of the pair of beams 54 and 55, is W2. However, during scanning of intermixed upright and inverted cants, it will be necessary to compare W2 with W1 (the bottom surface width) to determine which is the narrowest width. Moreover, the irregularity of the cant boundaries necessitates a comparison among the various narrowest widths calculated at each scan station along the length of the cant to ascertain the narrowest width portion of the flat surfaces along the length of the cant.

As stated earlier, the largest width of a rectangular finished workpiece derived from a cant 20 will be substantially no greater than the width of the narrowest width portion of the top and bottom flat surfaces 22 and 24. Hence, a transverse spacing for the cant-trimming saws 30 and 32 should be selected which will result in the largest standard lumber dimension which does not substantially exceed in width of the narrowest width portion. In this connection it must be understood that certain grades and sizes of finished lumber pieces are permitted a slight irregularity in their finished edges, as set forth by the National Grades for Dimension Lumber, and, hence, in applicable cases, the cant-trimming saw spacing may be slightly greater than the width of the narrowest width portion. As described earlier in the present example the saw spacing is adjusted by variable transverse movement of the saw 32 with respect to the saw 30.

Turning now to FIG. 1, once the cant-trimming saws are positioned relative to each other with a transverse spacing between the saws that is substantially no greater than the width of the narrowest width portion, cant orientation relative to the saws is effected by positioning adjustable stops 48 such that the cant 20, engaging the stops 48 with its bottom leading boundary 34, will be positioned with the boundaries of the narrowest width portion substantially outside of the parallel cutting lines defined by the spacing of the cant-trimming saws. (Again, certain grades and sizes of lumber permitted to have edge irregularity may permit a slight encroachment of a boundary into the space between the saws.) For example, assuming that the narrowest width portion of the cant is that shown in the cross-section of FIG. 3 having the width W2, it will normally be desirable to align the boundary 40 at this cross-section with the position of the fixed trimming saw 30 to insure proper orientation of the cant. Assuming that neither of the adjustable stops 48 engages the cant at a location corresponding to the narrowest width cross-section of FIG. 3, and assuming that the cant boundaries are irregular, the stops 48 will normally engage the cant at generally wider cross-sections. This means that the stops 48 will be positioned transversely in front of the cutting line of saw 30 a distance equal to the dimension D1 of FIG. 3 plus respective offset amounts $n$ equal to the amounts by which those portions of the cant which contact the stops, i.e. portions of the leading bottom boundary 34, precede the portion of the boundary 34 at the narrowest width cross section of FIG. 3 through the scanner. In this example, each offset amount $n$ corresponds to the difference between the X0 scan chain distance of the narrowest width portion of FIG. 3 and the respective X0 distance of the portion engaged by the respective stop 48. In this regard, it is important to note that the earliest A0 event at any scan station is assumed to have set the scan chain distance X0 to zero and, that each subsequent A0 event for the remaining scan stations (each respective set of crossed beams) will record the current scan chain distance for that scan station's X0 value. Each of the orienting stops 48 should be aligned such as to correspond with a respective scan station through which the cant 20 has traversed, so that X0 data is available for each stop location. Accordingly, the computer can easily ascertain the respective differences n between the X0 values of the cant at its points of engagement with the orienting stops 48, and the X0 value at the narrowest width portion of the cant. The respective stop offset distance n, when added to the dimension D1 of the narrowest width portion, gives the proper location of each stop 48 transversely in front of the cutting line of the fixed saw 30 and thereby properly orients the cant. (As an alternate arrangement, the fixed chipper trimming saw 30 could be located on the same side of the cant as the adjustable stops 48, and the adjustable chipper trimming saw 32 located on the opposite side of the cant. Such an arrangement would allow the adjustable stops 48 to position the cant with less total travel since they would only have to adjust for wane variations D2 instead of cant widths D1.)

Turning now to FIGS. 5A–D, an inverse cant 20' is shown advancing through the scan area. Again, the advancing cant causes four events A0-A3 which correspond to the cant boundaries 34, 36, 38 and 40, except that different boundaries are making and breaking the light beams since the event sequence is the same, the same formulae may be applied to calculate cant configuration. The calculation for the distance D2 from the leading top boundary 34 to the leading bottom boundary 38 is:

$$D2 = (X1 - X0) - (Bdd - H/\tan \phi) \qquad (5)$$

which for inverse cants will yield a negative number equal to the distance by which the leading top boundary 34 precedes the leading bottom boundary 38 and indicating to the computer 44 that an inverse cant is being presented. The capability to scan inverse cants permits an advancing series of intermixed upright and inverse cants to be scanned without necessitating either a scanner readjustment or dual scanners and eliminates the necessity of special cant handling equipment to insure that only cants of an upright orientation are placed upon the conveyor 45.

Referring now to FIG. 1, the exemplary embodiment of the present invention provides a plurality of scan stations spaced along the longitudinal axis of the cant and, hence, cant boundaries 34, 36, 38 and 40 may be ascertained at a plurality of points along the cant 20 in order to obtain a clear picture of its configuration. Placement or spacing of the plurality of scan stations is determined by the degree of cant irregularity and the degree of accuracy required. As mentioned previously, at least two scan stations should be closely aligned with the positions of the cant orienting stops 48 to insure subsequent proper cant orientation. A first set of conventional photodetectors 52 are positioned on a first line 70 extending transversely across the conveyor surface 45, and a second set of conventional photodetectors 53 are on a second line 71 parallel to and spaced from the first line 70. Positioning detectors 52 and 53 upon lines 70 and 71 permits the computer to sense deviations from a parallel presentation of the cant 20 to the planes formed by light beams 54 and 55; however, if this feature is not necessary, it is within the scope of the invention to permit sensor placement which does not correspond to parallel lines.

The scan stations are completed by a first set of light-emitting diodes 50 (LED) positioned on a third line 72 and directing a plurality of light beams 54 upon the corresponding light sensors 52 and by a second set of light-emitting diodes 51 (LED) positioned on a fourth line 73 and directing a second plurality of light beams 55 upon the corresponding light sensors 53. The LEDs within each light source array 50 and 51 are connected in series and driven from a common power source 74. This provision provides a scanner requiring minimal energy consumption and having a simplified design. It is important to note, however, that the plurality of light beams 54-55 can be supplied by a pair of diode lasers or the like sweeping across the scan area so as to sequentially direct light to the sensors 52 and 53. Alternatively, the plurality of light beams 54-55 can be supplied by any elongate conventional light source, such as steady state quartz-line lamps, disposed so as to constantly direct light to the sensors 52 and 53.

Figure 2:
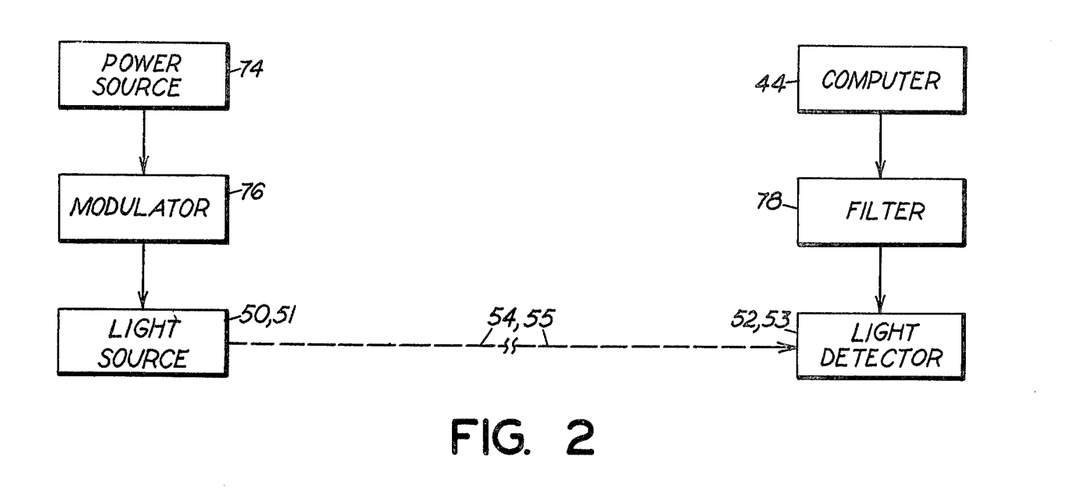
FIG. 2 is a functional block diagram of the scanning system of FIG. 1.

LED arrays provide simplified design by eliminating the necessity for parallel sweep apparatus as well as eliminating excessive energy consumption. Low energy requirements and high frequency electrooptical qualities of LEDS also permit conventional oscillator circuits 76, such as that provided by Sohn et al U.S. Pat. No. 3,852,579, to vary the intensity of the light beams 54 and 55 at a frequency higher than any fluctuations in the ambient light without necessitating complex apparatus for rotating apertured disks such as that of Kur U.S. Pat. No. 3,671,726 to achieve amplitude modulation of the light beams 54 and 55. Accordingly, the preferred embodiment of the present invention utilizes conventional oscillatory circuitry 76 (FIG. 2) to modulate the plurality of light beams 54 and 55 by varying the intensity of the light emitted by the LEDs at a frequency exceeding those of ambient light fluctuations. Conventional filtering circuitry 78, receptive to this frequency, is used intermediate sensors 52 and 53 and the computer 44 to insure that the scan data received by the computer is not affected by ambient light fluctuations. Although a frequency of 10 KHZ is provided by the modulator circuitry 76 of an exemplary embodiment, frequencies as high as 10 MHZ are well within current technology. High frequency selection permits multiple pulse sampling prior to permitting the computer 44 to detect scan events A0-A3, during the time periods of which the cant 20 is effectively motionless, and thereby further insures scan accuracy by preventing random high frequency light fluctuations from being recognized as one of the four scan events. It being understood, however, that any of a wide range of conventional modulation techniques, including varying the light frequency rather than the light intensity, can be employed without departing from the scope of the present invention.

It will be recognized that while a computerized and highly automated type of machinery is contemplated for utilizing the foregoing method, the method could, with much less efficiency, be utilized without benefit of such apparatus. Accordingly, the scope of the invention is intended to include manual or semi-automatic computation and manipulation as well as the more efficient system disclosed.

The terms and expressions which have been employed in the foregoing abstract and specification are used therein as terms of description and not of limitation, and there is no intention in the use of such terms and expressions, of excluding equivalents of the features shown and described, or portions thereof, it being recognized that the scope of the invention is defined and limited only by the claims which follow.

What is claimed is:

1. A method for determining the configuration of an elongate cant, having top and bottom substantially flat mutually parallel surfaces separated by longitudinal wanes and having a generally trapezoidal cross section, while said cant is on a supporting surface with one flat surface of said cant being supported by said supporting surface and each longitudinal wane of said cant forming an acute angle with respect to said supporting surface, and thereafter cutting lumber from said cant at dimensions dependent upon said cant configuration, said method comprising:
   (a) placing said cant upon said supporting surface with a flat surface thereof resting upon said supporting surface;
   (b) projecting a first plurality of light beams, spaced longitudinally with respect to said cant, through said supporting surface at a first acute angle with respect to said supporting surface which is less than any acute angle formed by one of said longitudinal wanes of said cant with respect to said supporting surface;
   (c) projecting a second plurality of light beams spaced longitudinally with respect to said cant in alignment with said first plurality of light beams, through said supporting surface at a second acute angle with respect to said supporting surface, said second acute angle facing oppositely to said first acute angle and being less than any acute angle formed by the second one of said longitudinal wanes of said cant with respect to said supporting surface;
   (d) effecting relative motion between said cant and said first and second plurality of light beams respectively in a direction transverse to said longitudinal wanes so that the longitudinal boundaries of said respective flat surfaces sequentially interrupt and then restore each light beam of said first and second plurality of beams;
   (e) detecting the amounts of said relative motion corresponding to said respective interruptions and restorations of each light beam of said first and second plurality of light beams;
   (f) determining the width and boundary locations of the narrowest width portion of said flat surfaces from said amounts of relative motion detected in step (e);
   (g) positioning a pair of parallel, spaced cant-trimming saws relative to one another at a transverse space between said saws substantially no greater than said width of said narrowest width portion; and
   (h) longitudinally advancing said cant toward and through said spaced cant-trimming saws while maintaining said boundaries of said narrowest width portion of said cant substantially outside of said transverse space between said saws.

2. The method of claim 1 wherein steps (b) and (c) include modulating said first and second plurality of light beams by varying the intensity of said beams at a frequency higher than any fluctuations in the ambient light surrounding said cant, and step (e) includes detecting the interruptions and restorations of said modulated first and second plurality of light beams.

3. The method of claim 1, further comprising determining the height dimension of said cant, said height dimension being defined as the perpendicular distance between said top and bottom flat surfaces of said cant, and wherein step (f) comprises determining said width and boundary locations from said height and said amounts of relative motion.

4. The method of claim 3, further comprising determining the respective distances between the points at which aligned beams of said first and second plurality of beams pass through said supporting surface, and wherein step (f) comprises determining said width and boundary locations from said distances, said first and second acute angles, said height and said amounts of relative motion.

5. A method for determining the configuration of an elongate cant, of the type having top and bottom substantially flat, mutually parallel surfaces separated by longitudinal wanes and having a generally trapezoidal cross section, said method comprising:
   (a) placing said cant upon a supporting surface with either one of the flat surfaces thereof resting upon said supporting surface;
   (b) projecting a first plurality of light beams, spaced longitudinally with respect to said cant, through said supporting surface at a first acute angle with respect to said supporting surface which is less than any acute angle formed by one of said longitudinal wanes of said cant with respect to said supporting surface;
   (c) projecting a second plurality of light beams spaced longitudinally with respect to said cant in alignment with said first plurality of light beams, through said supporting surface at a second acute angle with respect to said supporting surface, said second acute angle facing oppositely to said first acute angle and being less than any acute angle formed by the second one of said longitudinal wanes of said cant with respect to said supporting surface;
   (d) effecting relative motion between said cant and said first and second plurality of light beams respectively in a direction transverse to said longitudinal wanes so that the longitudinal boundaries of said respective flat surfaces sequentially interrupt and then restore each light beam of said first and second plurality of beams;
   (e) detecting the amounts of said relative motion corresponding to said respective interruptions and restorations of each light beam of said first and second plurality of light beam; and
   (f) determining the width and boundary locations of the narrowest width portion of said flat surfaces from said amounts of relative motion detected.

6. The method of claim 5 further comprising determining the height dimension of said cant, said height dimension being defined as the perpendicular distance between said top and bottom flat surfaces of said cant, and wherein step (f) comprises determining said width and boundary locations from said height and said amounts of relative motion.

7. The method of claim 6 further comprising determining the respective distances between the points at which aligned beams of said first and second plurality of beams pass through said supporting surface, and wherein step (f) comprises determining said width and boundary locations from said distances, said first and second acute angles, said height and said amounts of relative motion.

* * * * *